US006058194A

United States Patent [19]

Gulli et al.

[11] Patent Number: 6,058,194

[45] Date of Patent: May 2, 2000

[54] SOUND-CAPTURE AND LISTENING SYSTEM FOR HEAD EQUIPMENT IN NOISY ENVIRONMENT

[75] Inventors: Christian Gulli, Castelnau de Medoc; Gérard Reynaud, Begles, both of France

[73] Assignee: Sextant Avionique, Velizy Villacoublay, France

[21] Appl. No.: 08/913,848

[22] PCT Filed: Jan. 14, 1997

[86] PCT No.: PCT/FR97/00061

§ 371 Date: Sep. 26, 1997

§ 102(e) Date: Sep. 26, 1997

[87] PCT Pub. No.: WO97/27723

PCT Pub. Date: Jul. 31, 1997

[30] Foreign Application Priority Data

Jan. 26, 1996 [FR] France .................................. 96 00935

[51] Int. Cl.$^{7}$ ...................................................... H04B 15/00

[52] U.S. Cl. ............................................. 381/94.8; 381/72

[58] Field of Search .......................... 381/72, 94.4, 94.8, 381/13, 94.9, 94.1, 74, 71.6, 317, 318, 93

[56] References Cited

U.S. PATENT DOCUMENTS

| | | | |
|---|---|---|---|
| 3,700,812 | 10/1972 | Springett | 381/94.4 |
| 5,058,081 | 10/1991 | Gulli et al. . | |
| 5,226,088 | 7/1993 | Winterer et al. | 381/94.8 |
| 5,500,903 | 3/1996 | Gulli . | |
| 5,586,192 | 12/1996 | De Bijl et al. | 381/94.4 |
| 5,594,799 | 1/1997 | Herrmann | 381/13 |
| 5,661,809 | 8/1997 | Chahabadi et al. | 381/13 |
| 5,673,324 | 9/1997 | Kasser et al. | 381/13 |

*Primary Examiner*—Vivian Chang

*Attorney, Agent, or Firm*—Oblon, Spivak, McClelland, Maier & Neustadt, P.C.

[57] ABSTRACT

The system of the invention includes a sound-capture and listening system for a helmet in a noisy environment, and is characterized in that it includes, on the sound-capture side, at least one microphone (20) followed by a sampling device (25), by a decimator (26), by a device (27) for compensating for signal distortions arising within the whole of the upstream acoustic chain, and on the listening side, an interpolator (5) followed by a device for compensating for the defects of audiometry of the operator (6) and by an active noise reduction loop (10, 11, 7, 12, 13, 14).

20 Claims, 1 Drawing Sheet

SOUND-CAPTURE AND LISTENING SYSTEM FOR HEAD EQUIPMENT IN NOISY ENVIRONMENT

BACKGROUND OF THE INVENTION

1. Field of the Invention

The present invention relates to a sound-capture and listening system for head equipment in a noisy environment.

2. Discussion of the Background

In a very noisy environment, such as, for example, that prevailing in a cockpit of a military aircraft, the apparatuses for sound capture, restitution and processing of the voice are not optimized, and are even, mostly, poorly implemented. The radio communications between the crew and other speakers are of poor quality. The users communicate with several other speakers (other aircraft, ground stations, the other members of the crew, their own voice back again). These communications are monophonic, affected by interference, fairly unintelligible and are not hierarchized. If several sound alarms occur simultaneously, they are difficult to discriminate from one another. These poor communications, when added to the environmental noise, contribute significantly to the fatigue of crews, and may even harm their hearing. The helmets which they wear protect them hardly at all from such noise. The only means available to them to try to make these communications somewhat more intelligible are controls for adjusting sound level, this being far from satisfactory. The various apparatuses which implement these sound communications are dissimilar and their characteristics are not always completely compatible.

SUMMARY OF THE INVENTION

The subject of the present invention is a sound-capture and listening system for a helmet in a noisy environment, which makes it possible to establish the most intelligible communications possible and to optimize the exchanges of digital signals with other devices of the audiophone system to which this sound-capture and listening system may be linked.

The sound-capture and listening system for a helmet in a noisy environment in accordance with the invention includes, on the sound-capture side, at least one microphone followed by a sampling device, by a decimator, by a device for compensating for signal distortions arising within the whole of the upstream acoustic chain, and on the listening side, an interpolator followed by a device for compensating for the defects of audiometry of the operator and by an active noise reduction loop.

BRIEF DESCRIPTION OF THE DRAWINGS

The present invention will be better understood on reading the detailed description of an embodiment, taken by way of non-limiting example and illustrated by the appended drawing in which.

DESCRIPTION OF THE PREFERRED EMBODIMENT

Figure 1:
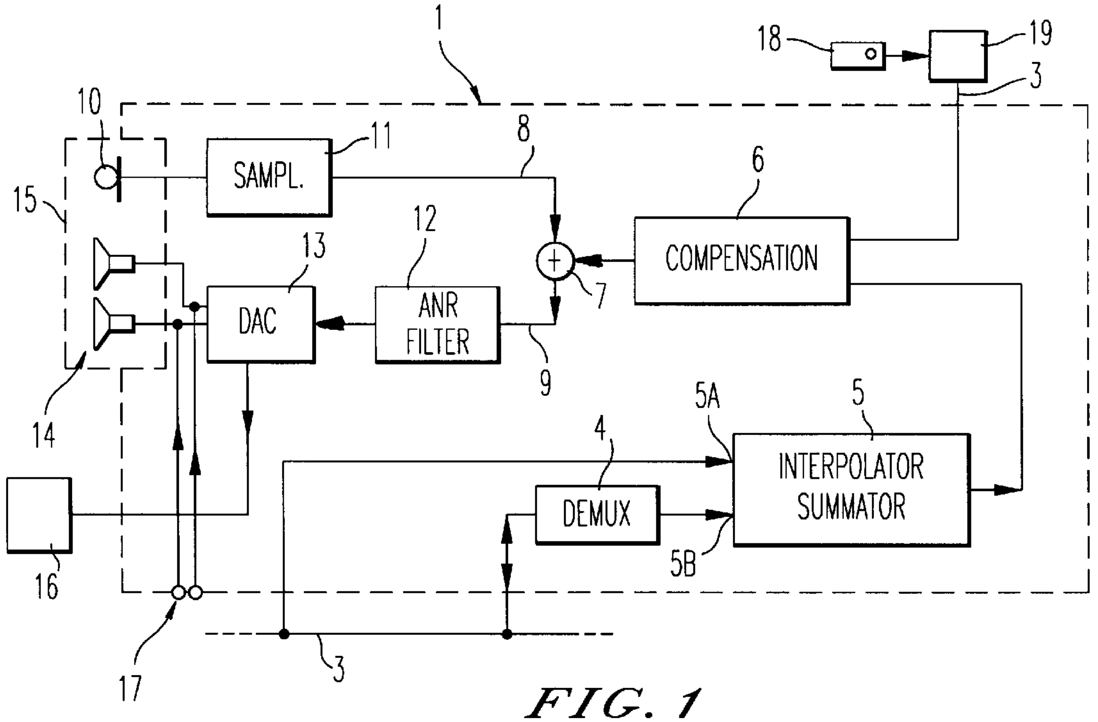
FIGS. 1 and 2 are block diagrams of listening and sound-capture circuits, respectively, in accordance with the invention.

The invention is described below with reference to an aircraft audiophone system, in particular for a combat aircraft, but it is of course not limited to such an application, and can be implemented equally well in other types of vehicles (land or sea) and in fixed installations, in particular in very noisy surroundings, such as, for example, in metallurgical plants. The user of this system is, in the present case, the pilot of a combat aircraft, but there may of course be several simultaneous users, in particular in the case of a civil transport aircraft, devices specific to each user being provided in corresponding number.

The sound-capture and listening system of the invention has been represented in the drawing in the form of two modules 1 and 2 linked to a bus 3, however the system can of course be constructed as a single module grouping together these two modules 1 and 2.

The module 1 essentially includes a demultiplexer 4, an interpolator and customized summation device 5 of the sound reproduction types (conventional and/or spatialized, spatialized meaning reproduction making it possible to locate at least approximately—i.e. to within a few degrees—the spatial origin of the sounds heard), a device 6 for compensating for the audiometric defects of the operator (physiological rendition), a summator 7. This summator 7 sums the signals originating from the device 6 and from a pathway 8, and sends the sum to a pathway The pathway 8 comprises a microphone 10 per headphone acoustic cavity, followed by a sampling device 11 whose sampling frequency is, like that of the interpolator 5, for example 96 kHz. The pathway 9 comprises a device 12 for active noise reduction, followed by a digital/analog converter 13 and by sound transducers 14 (headphones and/or loudspeakers) arranged, for example, in a helmet 15. of course, all the elements 4 to 7 and 11-12 are of digital type. The microphones 10 and loudspeakers 14 are arranged in an appropriate manner in the pathway with two independent channels, left and right.

The function of the module 1 is to afford each user comfortable listening to the sound signals produced by the various sources. These sources are, in particular, sound signals originating directly from the cockpit, on-board intercommunications (on-board telephone), radio communications, alarms, voice-synthesized messages, etc. An input 5A of the interpolator 5 is linked via the bus 3 to a device (not represented) for sound spatialization (sound effects allowing better locating of the sound sources). Another input 5B of the interpolator 5 is linked to the output of the demultiplexer 4, which receives from the bus 3 the monophonic sound pathways intended for the pilot(s). Another output of the demultiplexer 4 is linked, via the bus 3, to the spatialization device, to which it sends the monophonic pathways to be "spatialized". Advantageously, the outputs of the converter 13 are linked to a device 16 for analog recording of the listenings, and the loudspeakers 14 are linked to ports 17 to which analog emergency sound signals may be sent. Of course, the circuits included between the interpolator 5 and the helmet 15 are single-pathway, with two independent channels, left and right.

The helmet enclosing the microphones 10 and the loudspeakers 14 constitutes an acoustic cavity for them. The sounds picked up by the microphones are composed of noises coming from outside the helmet and sounds produced by the loudspeakers are sampled in 11, then subtracted from the signals arriving from 6. The result is processed by the filter 12, which is an active noise reduction filter. Digitization, in 11, is carried out, preferably, at a frequency of around 96 kHz, which represents a compromise between the time of traversal of the filter 12, the number and the type of cells of this filter, as well as the compatibility with the other sampling frequencies of the audiophone circuits which may be linked to the bus 3 (in the case described here, these frequencies are 6, 12, 24 and 48 kHz, as is the case for the circuits of conventional systems for aircraft).

The filter 12 is advantageously a recursive digital filter, producing noise in phase opposition with respect to that reaching the helmet from outside. The active noise reduction thus carried out supplements the passive auditory reduction carried out by the helmet (insulating materials and thickness). Active reduction is advantageously effective in a frequency band extending from a frequency of a few tens of Hertz to several hundred Hertz, and even around 1 kHz. This frequency band is that in which the passive reduction carried out by the helmet is fairly ineffective, since in this band the wavelength of the environmental noise is large relative to the thickness of the helmet. Together, these two protections, active and passive, can produce a noise reduction of around 35 to 40 dB, or better, over the whole band of auditory frequencies.

The compensation device 6 is a digital filter which compensates for the imperfections in the transfer function of the ear, and which makes it possible to increase the user's auditory acuity, thus improving the "spatialization" effect (3-dimensional sound) produced by the said spatialization device. Thus, spatial localization is all the better when the band of the signal perceived by the user is wide. The transfer function of such a filter is advantageously customized, for example with the aid of a memory card 18, specific to each user, introduced into a reader 19 linked to the device 5. This memory card contains the parameters relating to its user which make it possible to adapt the transfer function of the filter of the device 6 to the auditory characteristics of this user. Of course, the reader 19 and the card 18 can be replaced by any equivalent device (removable ROM, remote loading device etc.).

The demultiplexer 4 separates the various monophonic audio pathways multiplexed on the bus 3. These pathways originate, in particular, from the module 2 (described below), pathways for receiving radio equipment, on-board intercommunication, voice synthesis, alarms. The pathways present on the bus 3 and tapped off by the demultiplexer 4 so as to be sent directly to the interpolator 5 can be mixed, or else the user can select certain of them through appropriate control of the demultiplexer. Downstream of the interpolator, the resulting pathway is repeated identically on the left and right channels, so as to ensure compatibility with the "spatialized" pathway, which is necessarily forwarded to the two channels, these two channels then conveying mutually differing information. The user also has the possibility of commanding, via the demultiplexer, the sending of certain pathways to the said spatialization device so as to "spatialize" these pathways, which are sent back, after "3-D" (3-dimensional) processing, directly to the interpolator 5.

The sources of audio signals which may be present in an aircraft are most of the time sampled at different frequencies. Generally, the sampling frequencies are 6 kHz or radio communication and radio navigation signals, 12 kHz for alarms and for intercommunications with the ground and with the bay crew members, if appropriate, and 24 kHz for cockpit intercommunications. The sampler 11 operating, as specified above, at a frequency of 96 kHz so as to allow effective active noise reduction, it is necessary for the signals arriving at the summator 7 from the demultiplexer 4 to have the same sampling frequency. The interpolator 5 ensures this "setting to level" of the sampling frequencies by interposing, in a manner known per se, "null" samples between the "useful" samples.

Figure 2:
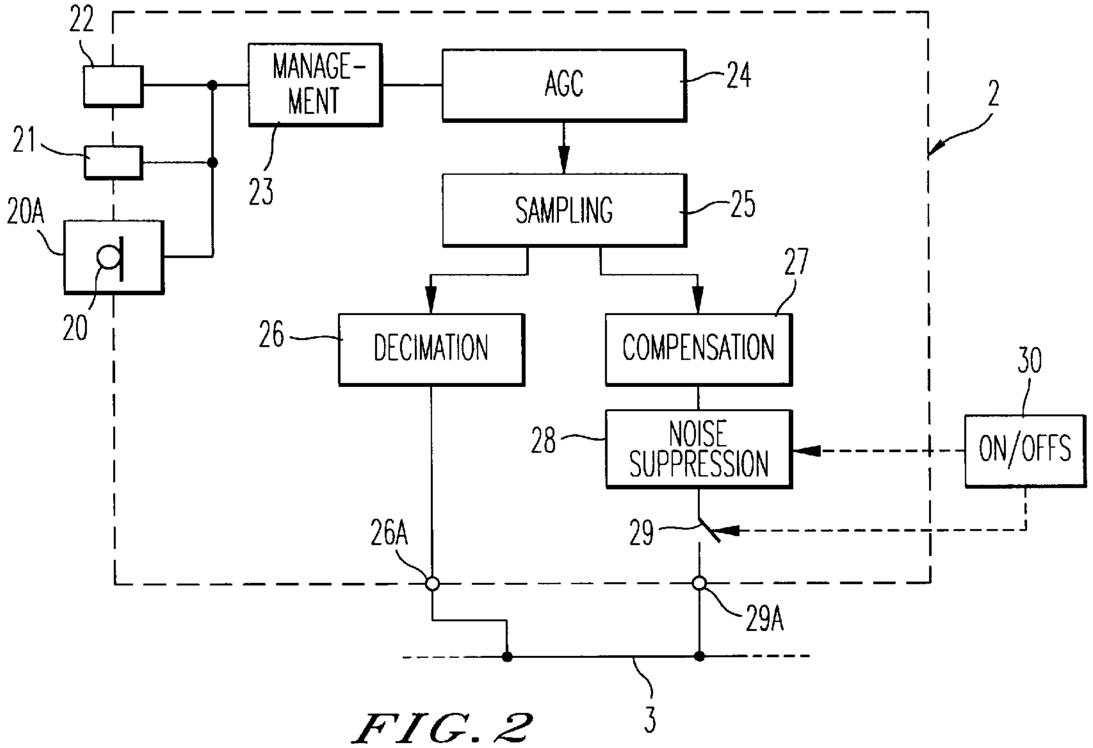

The module 2 (FIG. 2) for sound capture ensures acquisition of the user's voice signal so as to send it to his helmet (verification of the presence of this signal), to the radio communication equipment (possibly via antieavesdropping and encryption circuits), the on-board intercommunication equipment and the voice command devices.

The module 2 cooperates with several sensors: a main microphone 20 fitted on the user's breathing mask 20A or helmet 15, cranial sensors 21, and emergency sensors 22. These sensors are linked to a sensor management device 23, followed by an automatic gain control circuit 24 and by a sampling circuit 25. The circuit 25 is linked on the one hand to a decimation circuit 26 and on the other hand to an acoustic compensation circuit 27, followed by a noise-suppression circuit 28. The noise-suppression circuit 28 is linked to the audio bus 3 via a switch 29 controlled by on/offs 30, which also control the circuit 28. These on/offs are, for example, pushbuttons operated by the user to allow him to select the mode of oral communications which he desires to use (radio or on-board intercommunication or voice command). The control inputs of the circuits 23, 25, 27, 28 are linked to the bus of a management processor (not represented), so as to select the sensor(s) to be used (control of 23) and the processing (control of 25, 27 or 28). The output 26A of the filter 26 is linked via the bus 3 to antieavesdropping circuits (if they exist, and not represented) and voice recognition circuits. The output 29A of the switch 29 is linked via the bus 3 to the audio listening and spatialized sound circuits of the module 1, to the radio and intercommunication equipment, if they exist.

The radio and intercommunication on/offs 30 trigger the digitizing of the microphone signal, or else, in the case in which the noise suppression of the microphones is active, the implementation of the corresponding noise-suppression algorithm. In all cases, pressing any one of the on/offs opens the switch 29. Thus, although the permanent activation of a microphone is necessary so as to operate the noise-suppression of this microphone and the voice recognition, the audio feedback link is necessary only while speaking.

The cranial microphone sensors 21, also called osteomicrophones are, together with the microphones 22, emergency sensors making it possible to maintain oral communication when the pilot is called upon to take off his mask (in respect of a military aircraft, in case of emergency, indisposition, etc.) or in case of a fault in the main microphone 20.

The device 23 selects the active microphone. In the general case, this is the microphone 20 situated in the user's mask or on the rail fixed to the helmet. In case of a fault with this microphone, of poor fixing or of removal of this mask, the cranial sensors 21 or other sensors 22 are activated and the noise-suppression is disabled if it was operating.

The automatic gain control device 24 adapts the dynamic range of the signal from the microphone, that is to say the dynamic range of the speaker's voice, to that permitted by the digital coding (in general on 16 bits) used by the system, so as to avoid saturating the voice signal (which would impair the intelligibility and voice recognition rate, as the case may be).

The sampling device 25 advantageously has a sampling frequency of 24 kHz, thus allowing the audio signal to have a sufficient passband as to be easily "spatialized" (on passing through 27, 28 and 29).

On output from the sampler 25, the signals are sent to the circuit 26 and/or to the compensation device 27. The device 26 includes a decimation circuit (circuit deleting one sample out of two) halving the sampling frequency of the signals so as to make them compatible with the characteristics of the antieavesdropping and voice recognition circuits.

The compensation circuit 27 compensates the distortions undergone upstream in the whole of the acoustic chain by the voice signal (in particular in the cavity 20A of the speaker's breathing mask). This compensation circuit includes a digital filter whose coefficients are determined in accordance with the transfer function of the cavity+ microphone assembly, so as to obtain at the output of the circuit 27 a voice signal spectrum close to that which would be obtained in the mask. This processing is supplementary to a noise suppression carried out by the circuit 28.

The noise-suppression circuit 28 includes, for example, a rejector filter (whitening filter) and a frequency filter.

The system described above operates according to the following procedure. The circuit 23 selects the active microphone (from among the microphones 20 to 22). In order to talk, the operator presses the on/off 30. The circuit 24 adapts the gain of the microphone selected. The resulting signal is digitized in 25. The circuit 26 performs a decimation of the signals thus digitized, so as to optimize the transfer of data to other audio devices which the aircraft may include, and so as to ensure compatibility with other audio processing, such as, For example, voice recognition. The circuit 27 performs compensation of the distortions of the signal from the microphone, as specified above, and the circuit 28 suppresses the noise therein. The resulting signal is sent to the bus 3.

On the module 1 side, the said resulting signal arriving on the bus 3 is demultiplexed in 4, then interpolated in 5 to the sampling frequency of the active noise reduction loop (pathways 8 and 9 together with their elements), and other signals (arriving at 5A) may possibly be added thereto. The circuit 6 performs audiometric compensation (compensation for the defects in the audiometry of the operator) of the signals arriving from 5. The summator 7 inserts the signal thus compensated into the active noise reduction loop, comprising a microphone 10 per headphone acoustic cavity, the sampler 11, the correction filter 12, the converter 13 and a loudspeaker per headphone acoustic cavity 14.

What is claimed is:

1. A sound-capture and listening system for head equipment in a noisy environment, said sound-capture system comprising:

at least one microphone whose output is sampled by a sampling device;

a parallel combination of a decimater and a first compensating device connected to receive the output of said sampling device wherein said first compensating device compensates for signal distortion; and wherein said listening system comprises an interpolator receiving sound spatialized signals whose output is fed to a second compensation device wherein said second compensation device compensates for defects of audiometry of an operator and where the output of said second compensation device is fed to an active noise reduction loop system.

2. The system according to claim 1, wherein said sampling device further includes an automatic gain control device.

3. The system according to claim 1, wherein said first compensation device further includes a noise-suppression device.

4. The system according to claim 1, wherein said interpolator further includes a summator of external audio signal.

5. The system according to claim 1, wherein said second compensation device is also connected to receive the output of a memory card reader device.

6. The system according to claim 1, wherein said active reduction loop includes at least one microphone device, a sampler, a summator, a AMR noise filter, a digital/analog converter and at least one loud speaker.

7. The system according to claim 1, wherein said active noise reduction loop is connected to a listening analog recording device.

8. The system according to claim 2, wherein said first compensation device further includes a noise-suppression device.

9. The system according to claim 2, wherein said interpolator further includes a summator of external audio signals.

10. The system according to claim 3, wherein said interpolator further includes a summator of external audio signals.

11. The system according to claim 2, wherein said second compensation device is also connected to receive the output of a memory card reader device.

12. The system according to claim 3, wherein said second compensation device is also connected to receive the output of a memory card reader device.

13. The system according to claim 4, wherein said second compensation device is also connected to receive the output of a memory card reader device.

14. The system according to claim 2, wherein said active reduction loop includes at least one microphone device, a sampler, a summator, a AMR noise filter, a digital/analog converter and at least one loudspeaker.

15. The system according to claim 3, wherein said active reduction loop includes at least one microphone device, a sampler, a summator, a AMR noise filter, a digital/analog converter and at least one loudspeaker.

16. The system according to claim 4, wherein said active reduction loop includes at least one microphone device, a sampler, a summator, a AMR noise filter, a digital/analog converter and at least one loudspeaker.

17. The system according to claim 5, wherein said active reduction loop includes at least one microphone device, a sampler, a summator, a AMR noise filter, a digital/analog converter and at least one loudspeaker.

18. The system according to claim 2, wherein said active noise reduction loop is connected to a listening analog recording device.

19. The system according to claim 3, wherein said active noise reduction loop is connected to a listening analog recording device.

20. The system according to claim 4, wherein said active noise reduction loop is connected to a listening analog recording device.

* * * * *